Nov. 10, 1942.	W. P. STEVENS ET AL	2,301,341
HAND TRUCK
Filed Sept. 19, 1941
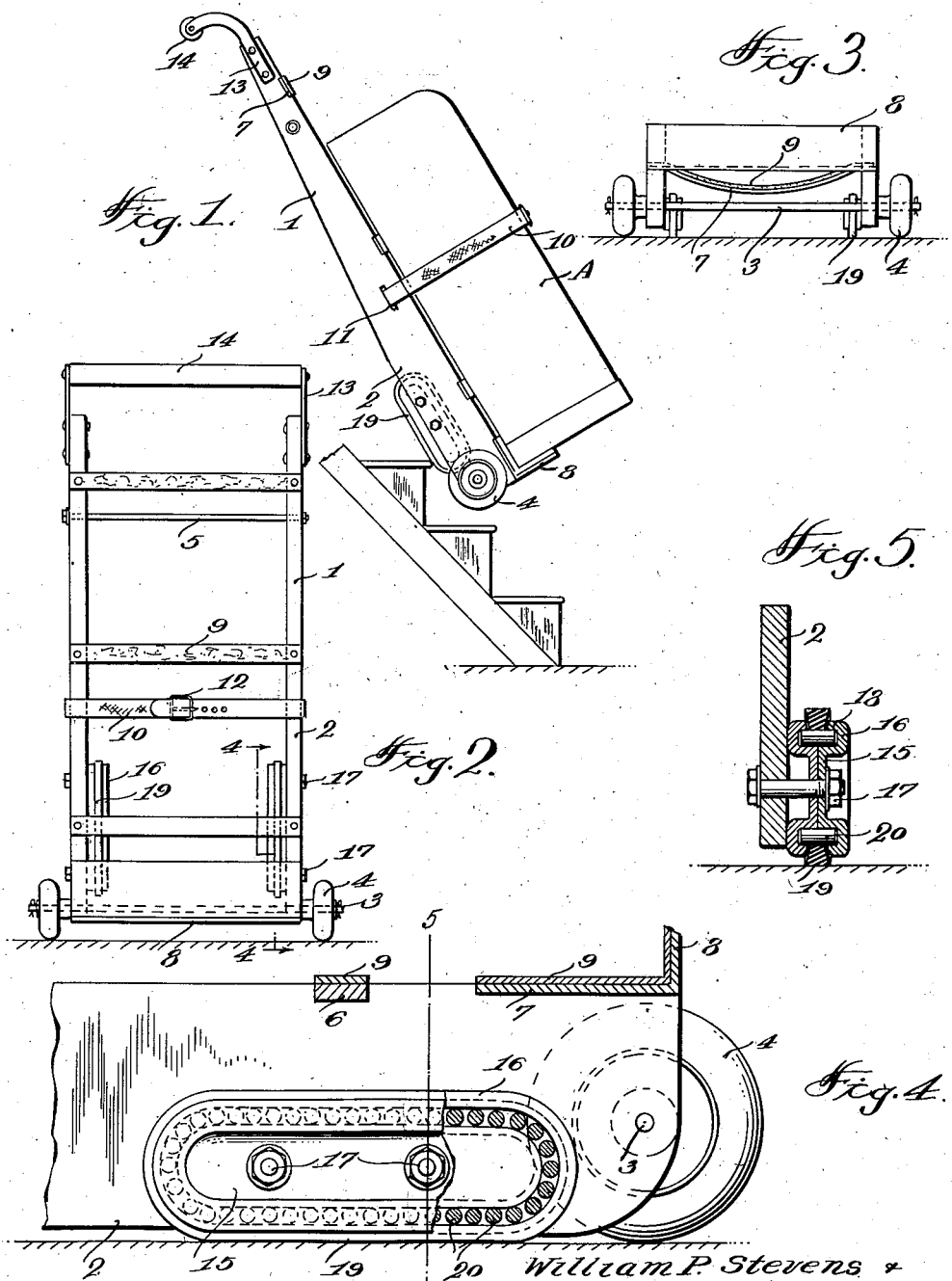
William P. Stevens &
Wade H. White  INVENTORS Patented Nov. 10, 1942

2,301,341

UNITED STATES PATENT OFFICE 2,301,341

HAND TRUCK

William P. Stevens and Wade H. White, Augusta, Ga.

Application September 19, 1941, Serial No. 411,580

2 Claims. (Cl. 305—9)

This invention relates to hand trucks, and its general object is to provide a truck that includes tread devices which materally facilitate the use of the truck on stairways and the like, in that said devices act to allow for free movement of the truck body with respect to stair treads and cooperates with the truck wheels to enable the user to easily and expeditiously handle a loaded truck in ascending and descending the stairs.

A further object is to provide a truck that includes roller hand gripping means which likewise facilitates the handling of the truck.

An important object is to provide a stair tread engaging devices for a hand truck, that can be readily attached to trucks now in general use, to bring about easy handling thereof on stairways and the like.

Another object is to provide a truck of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the truck which forms the subject matter of the present invention and illustrates the truck loaded and the association of the tread devices with respect to a stairway.

Figure 2 is a top plan view of the truck.

Figure 3 is an end elevation thereof.

Figure 4 is a sectional view taken approximately on line 4—4 of Figure 2, looking in the direction of the arrows.

Figure 5 is a sectional view taken approximately on line 5—5 of Figure 4.

Referring to the drawing in detail, it will be noted that the truck includes a frame made up of a pair of parallel side members 1 that may be reduced along their under faces for the major portion of their length toward their rear ends, but the front end portions 2 are relatively wide, and mounted in bearings therein, for bridging the portions 2 adjacent to their lower or forward ends is on axle 3 that extends through and outwardly beyond the side members for receiving and having journaled thereon wheels 4 which may be of the rubber tired type, as shown.

One or more tie rods are provided for the side members there being one rod 5 in the form shown disposed adjacent to the upper or rear ends thereof, and article supporting cross strips or bars 6 are secured to the upper faces of the side members in bridging relation thereto, at regular intervals, and it will of course be understood that the cross strips 6 also act as braces for the side members for holding the latter connected in parallel relation with respect to each other. The cross strips 6 are mounted in recesses in the side members for disposal flush with the upper faces thereof and said strips are preferably of arcuate formation to follow the curvature of cylindrical articles, such as a water heater A that is shown as being loaded on the truck in Figure 1.

Secured to and bridging the upper faces of the side members at the front or lower ends thereof is an angle plate 7 providing an article abutment lip 8, and the plate 7, as well as the cross strips 6 are covered with suitable cushioning material 9, such as felt, rubber or the like, to prevent marring or damage to an article, as will be apparent. The upper sides of the side members may likewise be covered with cushioning material. In order to hold an article fixed to the truck one or more straps may be provided there being one strap 10 shown and which extends through slots 11 in the side members, as well as has a buckle 12 on one end for receiving the opposite end portion of the strap for fixing the latter about the article, as clearly shown in Figure 1.

The upper or rear ends of the side members have secured to and extending rearwardly therefrom, the straight portions of handle mounting brackets 13 which include arcuate outer portions having a rod secured to and bridging the outer ends thereof and mounted for rotation on the rod is a roller 14 providing convenient hand gripping means that materially facilitates the handling of the truck, especially when using the same on a stairway or the like, as shown in Figure 1. When the truck lies flat as shown in Figure 3, the rollers 14 engage the floor, to bring about easy movement of the truck when in that position.

While the above described structure is of course important, the most important feature of the present invention lies in the tread devices and which in the form shown includes a pair of substantially elliptical track members each being made up of a pair of companion elongated plate sections having rounded ends and formed to provide flat body portions 15 having marginal square cornered laterally directed channel flanges 16 about the same. The track members are fixed to the confronting faces of the lower wide portions 2 of the side members to extend longitudinally thereof, by bolt and nut connections 17 which hold the companion sections together with the body portions thereof in face to face engagement and with the channel faces of the flanges directed toward each other for cooperation to provide an endless shouldered channel track. The outer portions 18 of the flanges are relatively narrow, so that when the sections are assembled, the outer portions 18 are disposed in spaced relation to each other, as clearly shown in Figure 5 to provide an entrance slot for receiving, holding and guiding the inner face portion of an endless V-belt 19 for rotation on a plurality of cylindrical roller bearings 20, loosely fitting and mounted in the channel of the track, for free rotation as will be apparent upon inspection of Figure 5, which likewise illustrates that the major portion of the belt is disposed exteriorly of the guide slot to provide ample tread means.

The tread devices are arranged on the side members, so that they extend below the under faces thereof, for the lower runs of the belts to engage the stair treads, as clearly shown in Figure 1, to allow for free movement of the side members relative to the stair treads, thus enabling the user to conveniently handle the truck when ascending and descending the stairway.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. In a hand truck, a wheeled and handled frame including side members, tread devices comprising endless channeled tracks fixed to the side members adjacent the lower ends thereof and having guide slots communicating with the channels of the tracks, roller bearings within the channels, and endless V-belts mounted for rotation on the bearings and extending through the slots to be guided thereby, and said belts having their lower runs disposed longitudinally of and below the under faces of said side members.

2. In a hand truck, a wheeled and handled frame including side members, a pair of tread devices one for each side member, and each device comprising an elliptical track member made up of a pair of companion elongated plate sections having rounded ends and formed to provide flat body portions, marginal square cornered laterally directed channel flanges formed on the body portions, means extending through the body portions for securing the sections of each track member together and to the side members of the frame with the channel faces of the flanges of each track member directed toward each other to provide an endless shouldered channel, the outer portions of the flanges being relatively narrow and spaced to provide a guide slot, roller bearings within the channels, and endless belts mounted for rotation on the roller bearings and extending through the slots for the disposal of the lower runs of the belts longitudinally of and below the under faces of said side members.

WILLIAM P. STEVENS.
WADE H. WHITE.